US006782356B1

(12) United States Patent
Lopke

(10) Patent No.: US 6,782,356 B1
(45) Date of Patent: Aug. 24, 2004

(54) HIERARCHICAL LANGUAGE CHUNKING TRANSLATION TABLE

(75) Inventor: Michael S. Lopke, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 928 days.

(21) Appl. No.: 09/679,227

(22) Filed: Oct. 3, 2000

(51) Int. Cl.[7] ............................................. G06F 17/28
(52) U.S. Cl. ......................................................... 704/5
(58) Field of Search ............................. 704/5, 7, 8, 3

(56) References Cited

U.S. PATENT DOCUMENTS

| | | | | |
|---|---|---|---|---|
| 5,510,981 A | * | 4/1996 | Berger et al. ................... | 704/2 |
| 5,867,811 A | * | 2/1999 | O'Donoghue ................... | 704/1 |
| 6,434,518 B1 | * | 8/2002 | Glenn ............................ | 704/3 |
| 6,438,515 B1 | * | 8/2002 | Crawford et al. ............... | 704/5 |
| 6,526,426 B1 | * | 2/2003 | Lakritz ......................... | 715/536 |

* cited by examiner

Primary Examiner—Susan McFadden

(57) ABSTRACT

In one embodiment, a computer executes a translation program for translating a phrase from a first language to a second language. Initially, the executing program receives the phrase to be translated. It then identifies in the phrase a translatable portion thereof. Next, it locates from a hierarchally-ordered expanded list of translation pairs, which each have equivalent first-language and second-language chunks, a pair having a first-language chunk that most closely matches the translatable portion with att least a part of the translatable portion being identical to the located first-language chunk. Finally, the executing program replaces at least a part of the translatable portion with the second-language chunk from the located translation pair. In this way, the executing program at least partially (if not completely) automatically translates the input phrase from the first language to the second language.

20 Claims, 9 Drawing Sheets

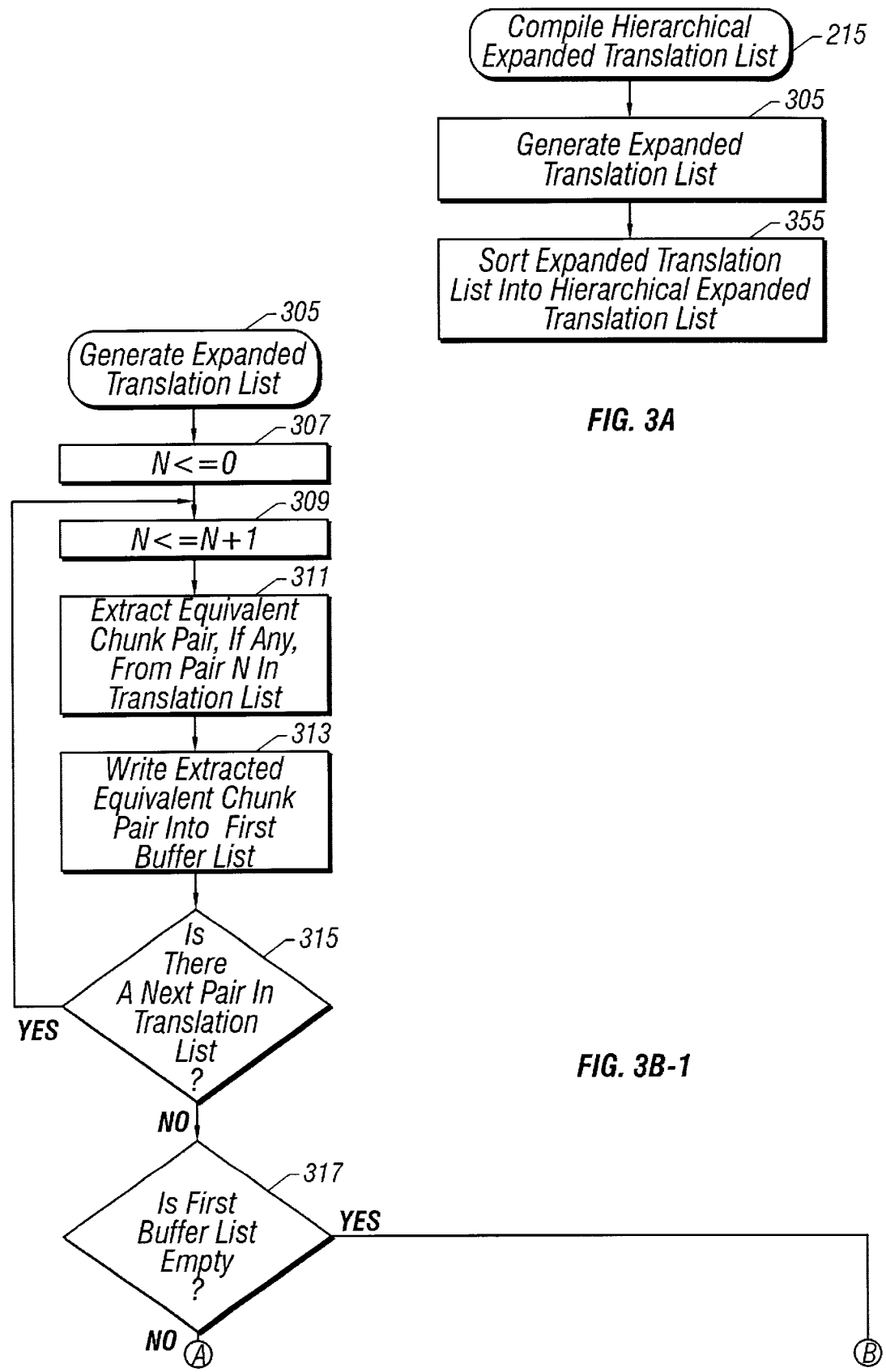

Hierarchal Expanded Translation List

| | English | | German | |
|---|---|---|---|---|
| 442a | HP OfficeJet Pro 1170C Printer/Copier/Scanner | = | HP OfficeJet Pro 1170C Drucker/Kopierer/Scanner | 442b |
| 444a | HP 51606R Inkjet print cartridge | = | HP 51606R Farbtintenpatrone | 444b |
| 446a | HP PhotoSmart Digital Camera | = | HP PhotoSmart Digitalkarera | 446b |
| 448a | HP ScanJet 5200Cse scanner | = | HP ScanJet 5200Cse scanner | 448b |
| 450a | HP DesignJet printer | = | HP DesignJet Drucker | 450b |
| 452a | Printer/Copier/Scanner | = | Drucker/Kopierer/Scanner | 452b |
| 454a | Inkjet print cartridge | = | Farbtintenpatrone | 454b |
| 456a | Digital Camera | = | Digitalkarera | 456b |
| 458a | Copier/Scanner | = | Kopierer/Scanner | 458b |
| 460a | Printer | = | Drucker | 460b |
| 462a | Scanner | = | Scanner | 462b |
| 464a | Copier | = | Kopierer | 464b |

*FIG. 4C*

HIERARCHICAL LANGUAGE CHUNKING TRANSLATION TABLE

TECHNICAL FIELD

The present invention relates generally to translating phrases from a first language to a second language. In particular, the present invention relates to a computer-implemented tool for translating a phrase from a first language to a second language.

BACKGROUND

With the World Wide Web (the "web"), companies can easily provide and market their products to consumers all over the world. A company will typically provide its content (such as product names and descriptions) in various languages, as desired by a web consumer. For example, if a product line (which is already released in the United States) was going to be released in Germany, German descriptions of the various products in the line would be made available over the web for German-speaking consumers. With current schemes, the English versions of the descriptions would be provided to a human translator for translation into German. Unfortunately, this can consume excessive resources and time.

Accordingly, what is needed is an improved scheme for translating phrases from a first language to a second language.

SUMMARY OF THE INVENTION

The present invention is directed to a computer having a translation program. In one embodiment, a computer executes the translation program for translating a phrase from a first language to a second language. Initially, the executing program receives the phrase to be translated. It then identifies in the phrase a translatable portion thereof. Next, it locates from a hierarchally-ordered expanded list of translation pairs, which each have equivalent first-language and second-language chunks, a pair having a first-language chunk that most closely matches the translatable portion with at least a part of the translatable portion being identical to the located first-language chunk. Finally, the executing program replaces the at least a part of the translatable portion with the second-language chunk from the located translation pair. In this way, the executing program at least partially (if not completely) automatically translates the input phrase from the first language to the second language.

BRIEF DESCRIPTION OF THE DRAWING

For a more complete understanding of the present invention, reference is now made to the following descriptions taken in conjunction with the accompanying drawing, in which:

FIG. 3A shows one embodiment of a routine for compiling a hierarchally ordered expanded translation list;

FIG. 4C shows an exemplary hierarchally ordered expanded translation list generated from the expanded translation list of FIG. 4B;

DETAILED DESCRIPTION

Figure 1A:
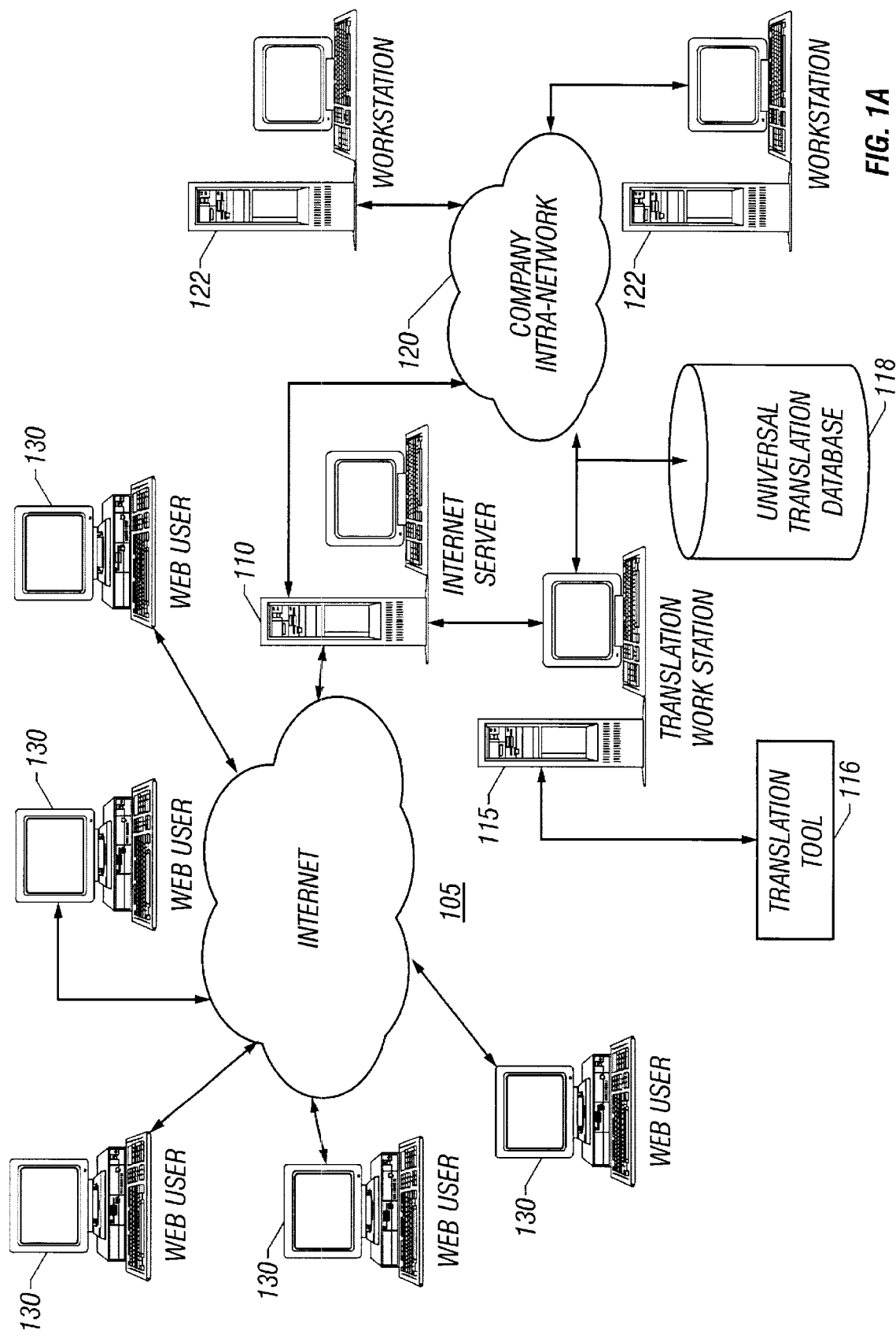
FIG. 1A is a block diagram showing a networked system with one embodiment of a translation program tool of the present invention.

FIG. 1A shows one embodiment of a translation work station 115 with a translation tool program 116 of the present invention. The translation work station 115 is connected to a company Internet server 110, which is connected to multiple web user computers 130 through the portion of the Internet 105 known as the World Wide Web (the Web). In addition, translation work station 115 is connected to internal company workstations 122 via a company intra-network 120. The translation work station 115 is also operably linked to a universal translation database 118.

The depicted computers, including the Internet server 110, translation work station 115, work station computers 122, and web user computers 130, can be implemented with any suitable configuration of one or more computers, including but not limited to mainframes, workstations, personal computers, and Internet appliances, running operating systems such as Windows NT, UNIX, LINUX, or any other computer operating systems.

The Internet server 110 includes Internet enabling software, which facilitates the web site. Internet enabling software may be implemented with any suitable Internet enabling software such as Apache, Microsoft IIS, and Netscape Enterprise Server.

Translation work station 115 executes and provides to internal company users (through work stations 122) translation tool 116—one embodiment of which will be addressed in greater detail below in relation to FIG. 2. The translation program 116 may be derived using any suitable programming language such as Pearl or C++.

It should be recognized that the depicted scheme for providing the translation tool of the present invention is only one of several ways of doing so. For example, any suitable executing program—whether executing in the Translation work station, the Internet server, work stations, or any other computer could be used for executing a translation tool program 116.

In one embodiment of the present invention, product information such as product descriptions, names and the like, can be translated at the translation work station 115 for any desired utilization such as for publication. In the depicted embodiment, this information is stored on Universal translation database 118. As desired by a person responsible for information content within the company (or organization), information (e.g., product title phrases) can be integrated into the company's web site(s) and provided on the Web through the Internet server 110. Persons needing to use or modify the information, as well as internal consumers thereof, can access it through work stations 122, which are connected to the translation work station 115 through the intra-network 120. For example, an internal user may be responsible for publishing, on the company's German site, German descriptions of a given product (or product family), which have been already published in English. Rather than sending all of the English descriptions to a human translator for translation, the user can simply send them to the translation work station for automated translation assistance via the translation tool 116. Once translated, the German descriptions could be sent back to the user or forwarded to the Internet server 110 for publication on the German site. Although much of the discussion herein is directed to translation from English to German, it will be appreciated that the inventive concepts disclosed herein are equally applicable to translations between any initial or source language and any second or destination language. Morever, a translation may be performed between a first language and a plurality of second or destination languages.

Figure 1B:
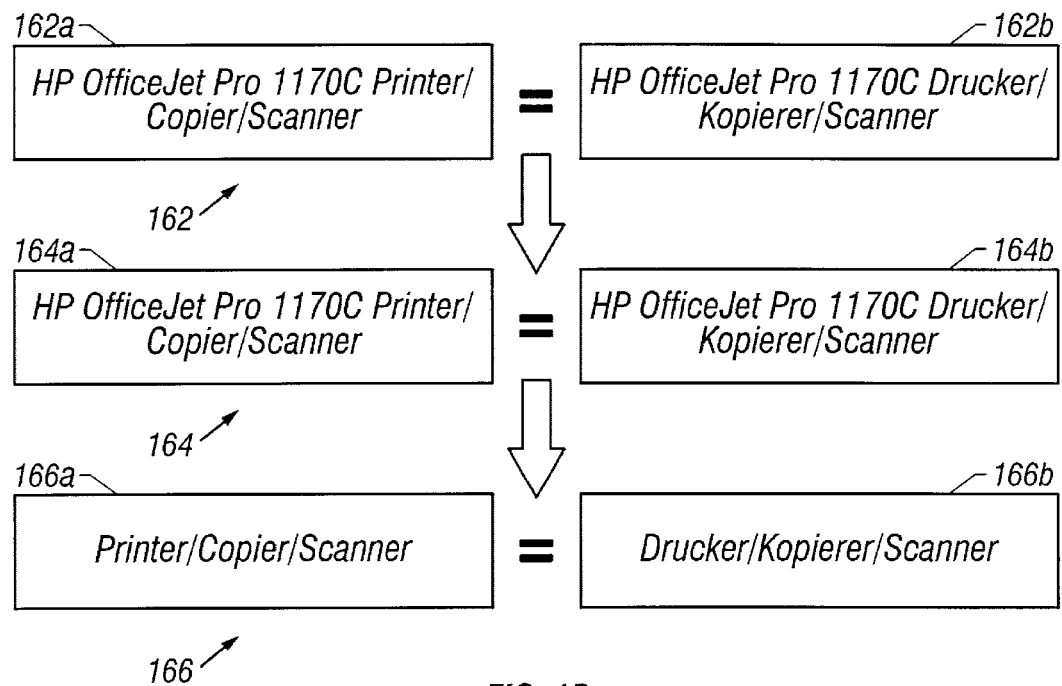
FIG. 1B shows one embodiment of a first translation pair and a second translation pair derived therefrom.

FIG. 1B shows a first to second language translation pair 162, which is used by a translation program 116 to translate a phrase. A translation pair is a pair of first language and second language chunks that are equivalent to one another. As used herein, a chunk (or phrase for that matter) can be any quantity of one or more words such as a word, a phrase, a paragraph, or an entire file. Translation pair 162 includes first language (English) chunk 162A and second language (German) chunk 162B. As depicted, these chunks are equal to one another. In one embodiment, an executing translation program receives an input list of translation pairs, expands the list by deriving therefrom additional translation pairs, hierarchically orders the expanded list into a hierarchal expanded list of translation pairs, and compares an input phrase to be translated against the translation pairs to find a "closest" match in order to replace a translatable portion within the input phrase with its second-language equivalent from the closest match.

FIG. 1B illustrates how one translation pair 166 can be derived from another translation pair 162. Initially, identical portions of the phrases 162A/162B are identified. This is represented at 164 with the identical portions being italicized. These identical portions are removed, and what remains is the derived translation pair 166.

Figure 2:
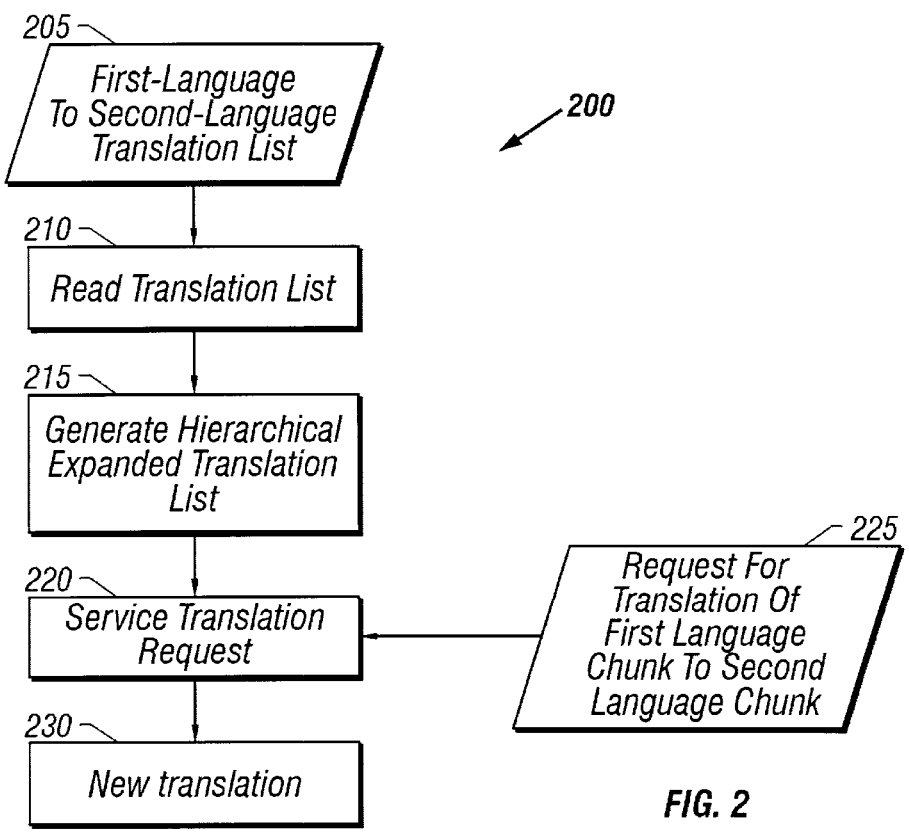
FIG. 2 shows one embodiment of a translation program routine of the present invention.

FIG. 2 shows one embodiment of a routine 200 for implementing a translation program 116 of the present invention. At step 210, a first to second language translation list is input into the executing routine. An example of such a translation list is depicted in FIG. 4A. At step 215, the routine generates a hierarchical expanded translation list. Basically, the step involves deriving additional translation pairs from the input translation pairs of the translation list and hierarchically ordering the combination of derived and input translation pairs. An example of a routine for implementing this expanded translation list to generation step is depicted in FIG. 3A and will be discussed in greater detail below.

Next, at step 220, the routine services a request for a chunk (or phrase) to be translated from the first language to the second language at 225. One embodiment of a routine for implementing step 220 will be discussed in greater detail below with reference to FIG. 3C. The routine ends with a resulting new translation at step 230. It should be noted that the translation program provides a translation tool for assisting a user in translating input phrases or chunks. The tool may completely or partially translate the input chunk, depending on how a particular program is configured. Thus, the "new translation" of step 230 may be a partial or complete translation.

FIG. 3A shows one embodiment of a routine 215 for compiling a hierarchical expanded translation list. Initially, at step 305, an expanded translation list is generated from the input translation list. Expanding a translation list into an expanded translation list involves deriving from (or parsing out of) input translation pairs additional, equivalent chunk pairs having first and second language chunks that are equal to one another. Finally, at step 355, the expanded translation list is sorted into a hierarchical expanded translation list. In this step, the translation pairs (including both the pairs from the original input translation list, as well as the derived pairs) are sorted based on a desired hierarchy. For example, in one embodiment, translation pairs are sorted based on the word count of the first language phrases. Pairs having the largest first language phrases are at the top of the list while those with the smallest number of words are at the bottom. This allows the "closest" first language translation phrase to be efficiently matched with a phrase that is being translated. However, persons with skill in the art will recognize that numerous other suitable hierarchical schemes exist in cooperation with a particular translation methodology.

Figures 2, 3B:
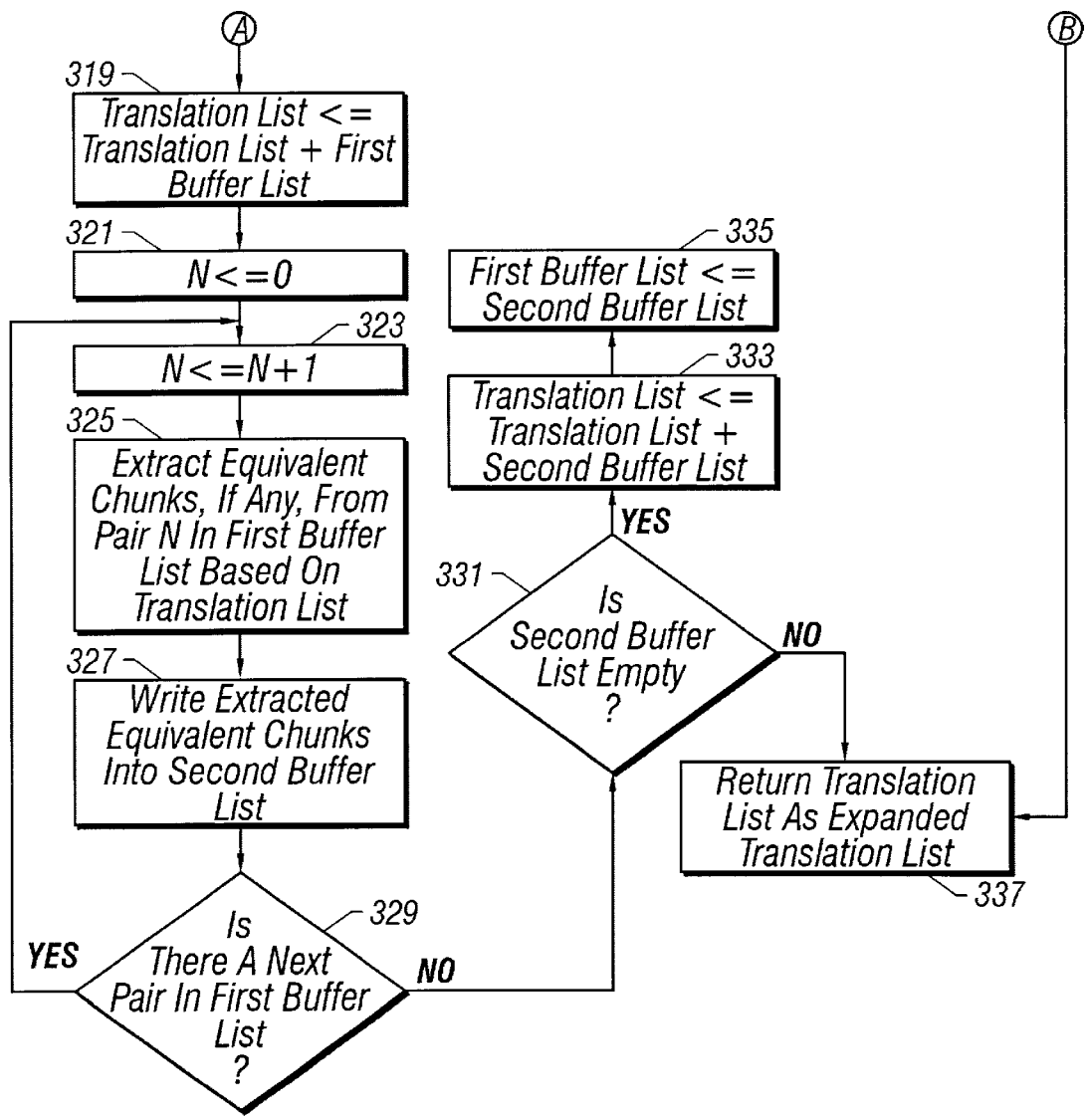
FIG. 3B shows one embodiment of a routine for generating an expanded translation list.
Figure 4A:
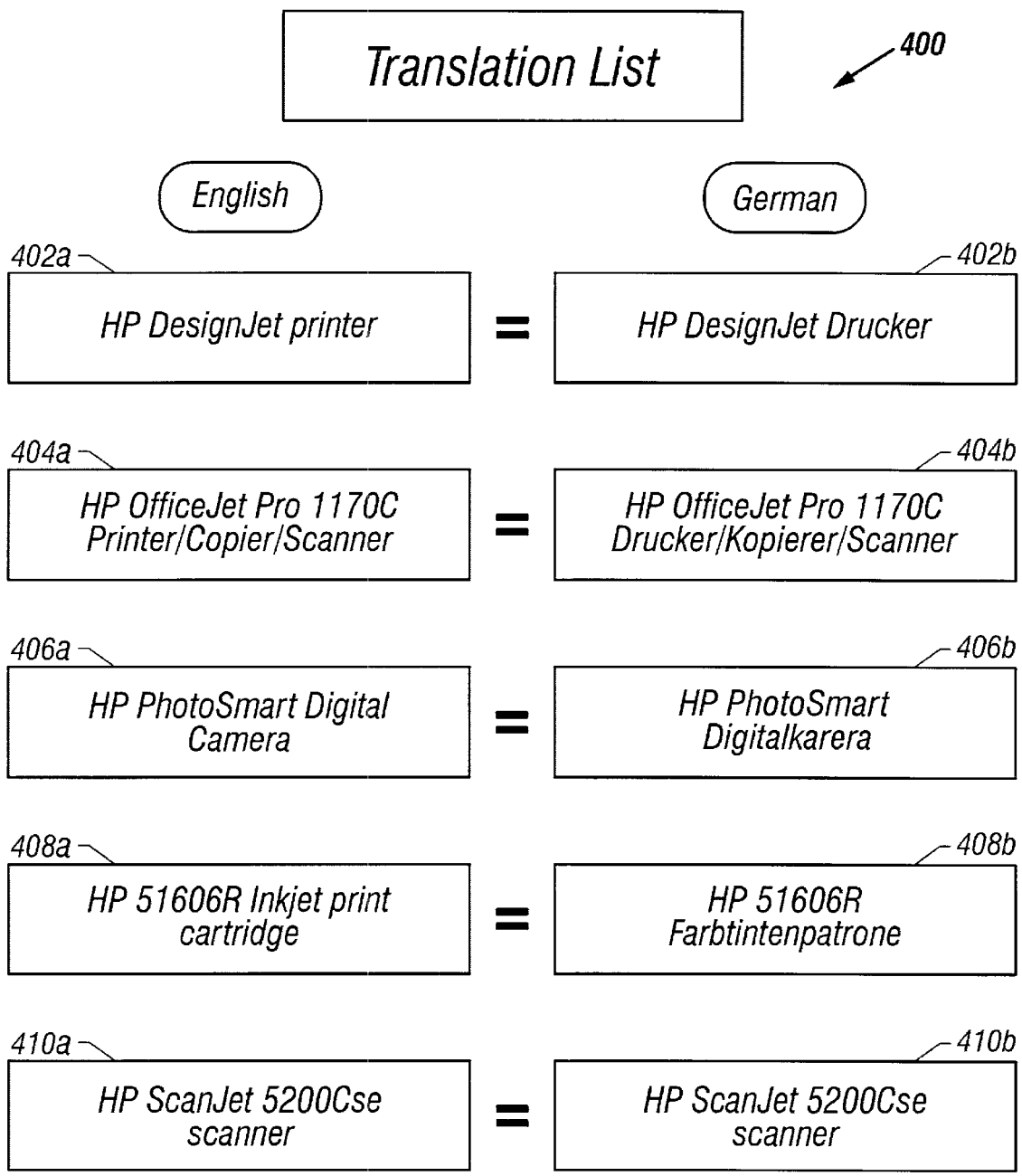
FIG. 4A shows an exemplary translation list.

FIG. 3B shows one embodiment of a routine 305, for generating an expanded translation list. Initially, at 307, a count variable, N, is set to 0. At step 309, the count is incremented by 1. Next, at 311, a derived translation pair (equivalent pair of chunks) is extracted from pair N (e.g., the first pair) in the translation list. If this were the first time through the loop, an equivalent chunk if any existed, would be extracted through the first translation pair in the input translation list. In extracting an equivalent chunk pair, the routine initially identifies and removes the identical portions (if any exist) from each of the first and second-language phrases within the translation pair. The like-sided remaining portion(s) from each phrase must then be equivalent to one another. This remaining like-sided portion is "extracted" from the original translation pair for use as a new, derived translation (or equivalent chunk) pair.

At step 313, the extracted equivalent-chunk (or translation) pair is written into a first buffer list. Next, at determination step 315, the routine determines whether another or next pair exists in the translation list. If one does exist, the routine returns back to step 309 where the count is again incremented by 1. It can thus be seen that steps 309 through 315 constitute a loop for extracting equivalent-chunk pairs from the input translation list and writing the extracted pairs into the first buffer list.

At determination step 315, if it was determined that a next pair in fact does not exist in the translation list, then the routine proceeds to determination step 317. At step 317, the routine determines whether the first buffer list is empty. The purpose of this step is to indirectly determine whether any new translation pairs were extracted (or derived) from the input translation list. If the routine determines that the first buffer list was in fact empty, then the routine proceeds to 337 and returns the translation list (as the expanded translation list) back to routine 215. On the other hand, at step 317, if it was determined that the first buffer list is not empty, then the routine proceeds to step 319. In this step, the translation list becomes the translation list plus the first buffer list. This means that the translation list is augmented with the derived translation pairs, which are stored in the first buffer list.

Because additional equivalent-chunk pairs may still exist within the previously derived chunk pairs, the routine proceeds at step 321 to re-examine the previously derived set of equivalent-chunk pairs (which are stored in the first buffer list) to look for additional equivalent-chunk pairs. This continues until in a given sweep through a set of derived pairs, no new equivalent-chunk pair is derived. At step 321, the count N is assigned the value 0. Next, at step 323, this count is incremented by 1. Next at step 335, equivalent chunks, if any, are extracted from the N chunk pair that is stored in the first buffer list—with additional guidance from the translation list. This step operates similarly as step 317 with the additional twist that words or chunks from the current translation list may be substituted for chunk portions within the first translation chunks of the chunk pairs in. That is, equivalent-chunk pairs derived from the previous sweep may be used to further extract sub equivalent-chunk pairs from previously extracted chunk pairs.

Next, at step 327, the extracted equivalent chunks are written into a second buffer list. The routine then proceeds to determination step 329 where it is determined whether a next pair exists in the first buffer list. If a pair does in fact exist, the routine returns back to step 323 where the count is incremented by 1. It can be seen that steps 323 through 329 form a loop for further extracting equivalent chunk pairs from previously extracted chunk pairs that are being stored in the first buffer list.

At step 329, if it is determined that there is no next pair in the first buffer list (indicating that the loop has processed the entire first buffer list), then the routine proceeds to determination step 331. At this step, the routine determines whether the second buffer list is empty. The purpose of this step is to indirectly determine whether any chunk pair was further extracted from the first buffer list. If the second buffer list is empty (indicating that no further pairs were derived from the previous sweep), then again the routine proceeds to determination step 337 and returns back to step 305 the translation list (which has been augmented by at least one sweep of a first buffer list) as the expanded translation list. Conversely, if it is determined at step 331 that the second buffer list is in fact not empty, then the routine proceeds to step 333. At this step, the translation list becomes the pre-existing translation list plus the contents within the second buffer list. This updates (or augments) the translation list with the newly derived translation chunk pairs, which were stored in the second buffer list. The routine then proceeds to step 335, where the first buffer list is assigned the contents of the second buffer list. The purpose of this step is to transfer the most recently derived chunk pairs into the first list so that additional chunk pairs, if any, can be derived therefrom. From here, the routine goes back to step 321 and proceeds as previously described.

In this way, chunk pairs are divided and sub-divided into equivalent chunk pairs until no chunk pair can be further derived (or expanded). The translation list is augmented with additionally derived chunk pairs with each "successful" sweep through the previously derived set of chunk pairs forming the expanded translation list.

Figure 3C:
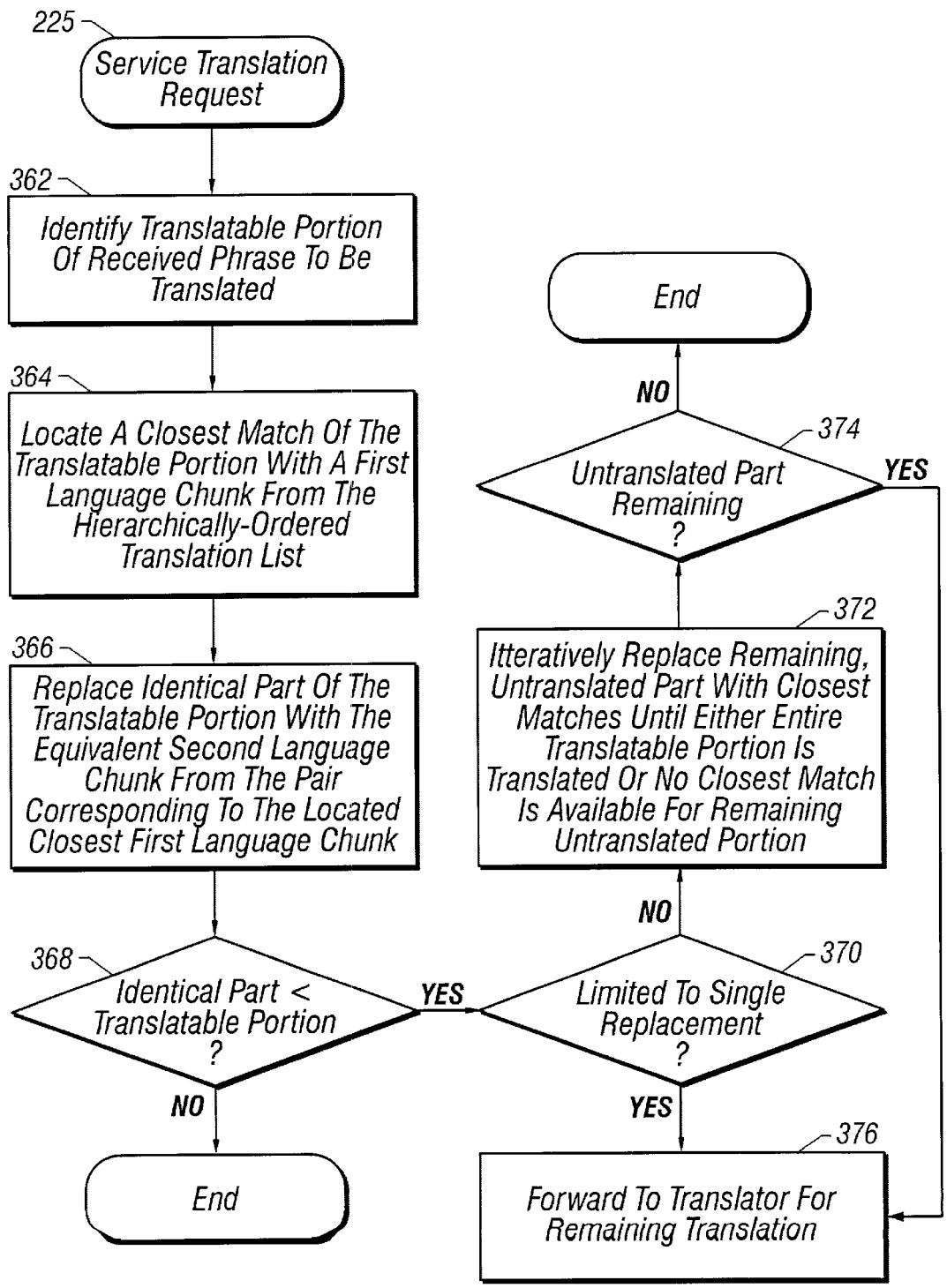
FIG. 3C shows one embodiment of a routine for servicing a translation request.

FIG. 3C shows one embodiment of a routine 225 for servicing a translation request. Initially, at step 362, the routine identifies a translatable portion from the received phrase to be translated. A phrase that is to be translated can typically be broken into two parts: a non-translatable portion and a translatable portion. The non-translatable portion is a portion of the phrase that remains the same through translation. An example of a non-translatable portion would be a commercial brand name such as "HP OfficeJetPro 1170C." The translatable portion would then be the remaining portion of the phrase. Thus, in one embodiment, the routine would identify a translatable portion by first eliminating the non-translatable portion of the phrase. The routine could determine which portion of the phrase is non-translatable in various ways, including referencing a look-up list with predefined terms or implementing a suitable heuristic scheme. Herein a non-translatable term generally refers to a term which includes a numeric character or more than one capital character.

The routine then proceeds to step 364. Here, it locates a closest match of the translatable portion with a first language chunk from the hierarchically ordered translation list. What is "closest" will depend upon a particularly implemented scheme, as well as on how the translation list is hierarchically ordered. In one embodiment, with the ordered translation list being ordered from phrases containing the largest number of words to phrases containing the least number of words, the routine begins at the top and searches for a first language phrase that is closest to the translatable portion. The matched first language phrase will be identical to at least a part of the translatable portion in this scheme.

Next, at 366, the routine replaces the identical part of the translatable portion with the equivalent second language chunk from the pair corresponding to the located closest first language chunk. Next, at determination step 368, the routine determines whether the identical part is less than the translatable portion. The purpose of this step is to assess whether the translatable portion has been completely translated. If the identical part is in fact less than the translatable portion, then the translatable portion has not been entirely translated. If the identical part is not less than the translatable portion (i.e., the entire translatable portion was translated), then the routine ends. Conversely, if the identical part is less than the translatable portion, then the routine proceeds to determination step 370. At 370, it is determined whether a single replacement limitation has been imposed (e.g., by a designer or administrator). If such a limitation has been imposed, then the routine proceeds to step 376, and the translated phrase (with its remaining untranslated part) is forwarded to a translator for the remaining translation. On the other hand, if a single replacement limitation has not been imposed within the system, then the routine at 370 would proceed to step 372.

At this step, the routine iteratively replaces remaining untranslated parts with closest matches until either the entire translatable portion has been translated or until no closest match is available for any remaining untranslated part. From here, the routine proceeds to determination step 374, where it determines whether any untranslated part of the translatable portion remains. If there is no untranslated part remaining, then the routine ends; on the other hand, if there is an untranslated part remaining, then the routine proceeds to step 378 where the translated phrase is forwarded to a translator for translating the remaining part of the translatable portion. It should be noted that the translator within the step could be any suitable translator such as a human translator.

Figure 4B:
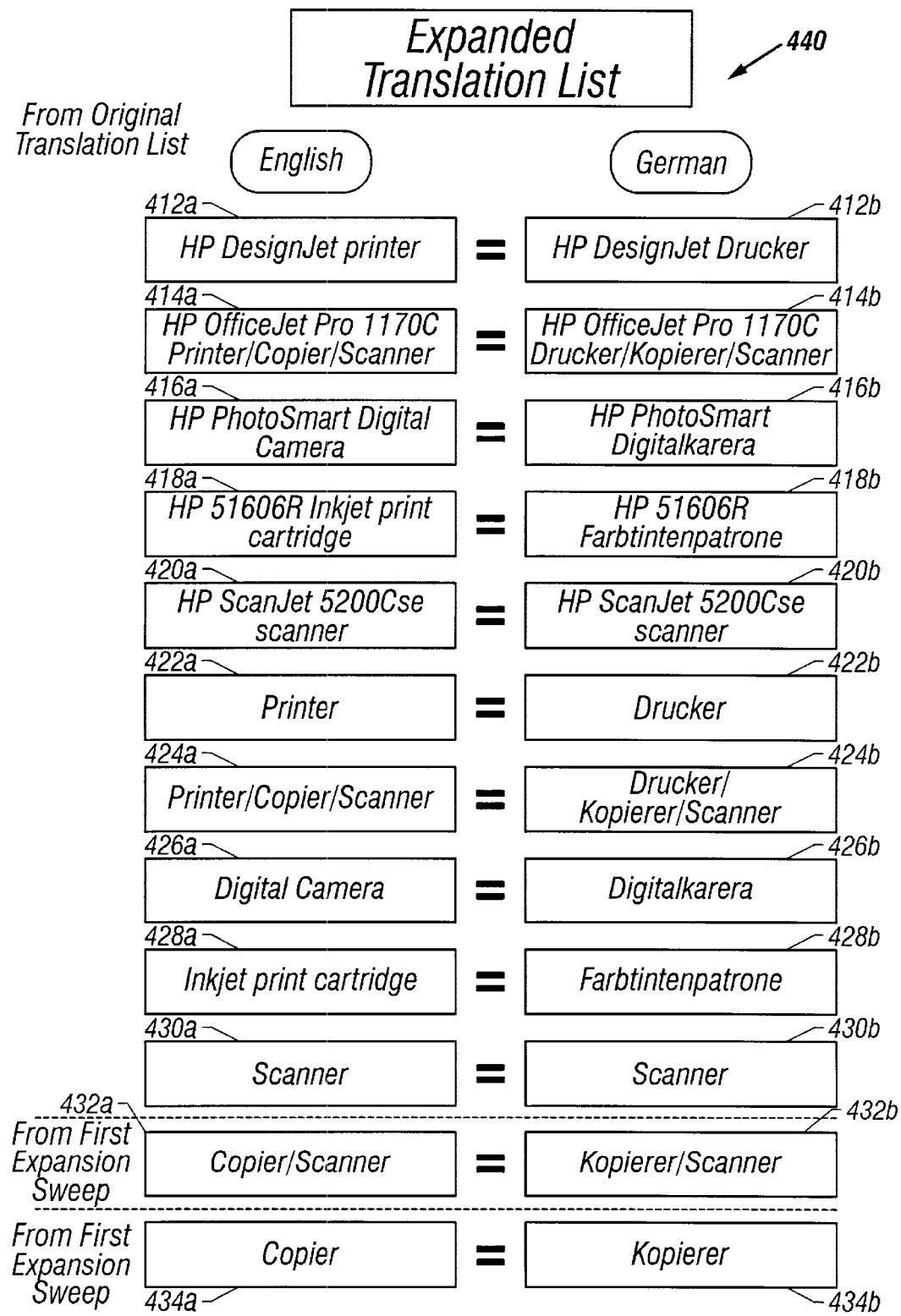
FIG. 4B shows an exemplary expanded translation list generated from the translation list of FIG. 4A.

With reference to FIGS. 4A–4C, and 5A and 5B, an example will now be presented using the routines depicted in FIGS. 2 and 3. FIG. 4A shows a translation list 400 that is read at step 210 from the routine depicted in FIG. 2. Translation list 400 includes English to German language translation pairs 402A/B–410A/B. FIG. 4B shows the expanded translation list which results when the routine generating an expanded translation list at 305 in FIG. 3B is executed. FIG. 4B includes translation pairs 412A/B through 434A/B. Translation pairs 412A/B through 430A/B are from the input translation list; translation pair 432A/B is derived (in a first sweep) from the input translation list; and pair 434A/B is derived (in a second sweep) from pair 432A/B.

FIG. 4C shows hierarchally expanded translation list 440. Translation list 440 includes translation pairs 442A/B through 464A/B. In this example, the pairs are ordered from those pairs with the greatest number of first-language (English) terms to those with the least number of first-language terms. For this ordering scheme, any suitable sorting method could be used. For example, in the depicted embodiment, a bubble sort was applied to the expanded translation list of FIG. 4B for generating the ordered translation list of FIG. 4C.

Figure 5A:
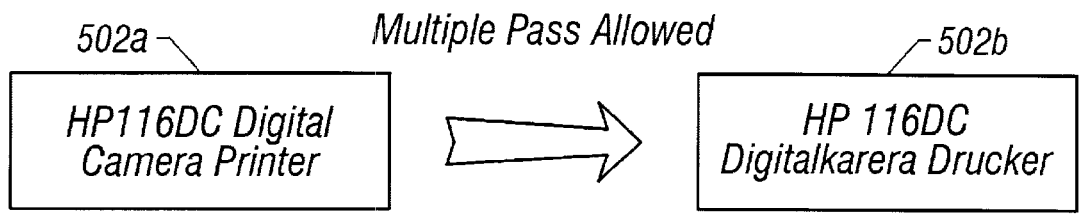
FIG. 5A shows an exemplary phrase translation using the hierarchally ordered expanded list of FIG. 4C.
Figure 5B:
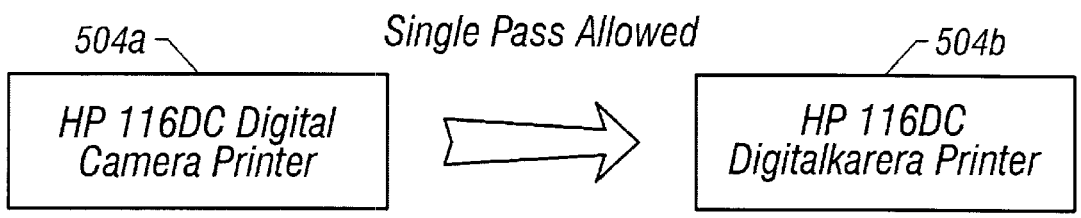
FIG. 5B shows an exemplary phrase translation using the hierarchally ordered expanded list of FIG. 4C.

FIGS. 5A and 5B show examples of translated phrases using the translation routine of FIG. 3C and the hierarchal expanded translation list of FIG. 4C. In FIG. 5A, an English phrase 502A is translated with multiple passes (no single replacement limitation) being allowed. The resulting German translation is shown at 502B. With this example, two passes were used to translate the translatable portion: "Digital Camera Printer" to "DigitalKarera Drucker." With the ordered translation list of FIG. 4C, first "Digital Camera" is replaced and then "Printer" is replaced.

FIG. 5B shows English phrase 504A, which is to be translated to German but with a single pass (single replacement) restriction. In this example, the ordered nature comes into play. With a single replacement limitation, only the "Digital Camera" part is translated.

It may not seem clear why a designer would choose to use such a single replacement restriction, however translation is not strictly limited to substituting equivalent terms and chunks. With various languages, equivalent chunks may appear in different parts of a phrase. Thus, it may be desirable to limit the translation to a single chunk replacement and forward the partially translated phrase to a translator. When large numbers of phrases are being translated, it is still more efficient to use a translation program even if some of the phrases are not completely translated.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for translating a phrase from a first language to a second language, comprising the steps of:

identifying from the phrase, a translatable portion to be translated;

locating a closest match of the translatable portion with a first language chunk from a hierarchically-ordered translation list having first to second language translation pairs that each have a first language chunk and a correspondingly equivalent second language chunk, wherein the located closest first language chunk is identical to at least a part of the translatable portion; and replacing the identical part of the translatable portion with the equivalent second language chunk from the pair corresponding to the located closest first language chunk.

2. The method of claim 1 wherein the closest match is a first language match in the list that maximizes the size of the at least a part of the translatable portion.

3. The method of claim 1 wherein the identified translatable portion does not include proper terms.

4. The method of claim 1 wherein the hierarchically-ordered translation list is ordered based on the number of words in the first language chunk.

5. The method of claim 4 wherein the step of locating a closest match comprises the step of:

beginning with the first language chunks with the most words and progressing downward to first language chunks with lesser word counts.

6. The method of claim 1 further comprising the step of:

generating the hierarchally-ordered translation list.

7. The method of claim 6 where the step of generating the hierarchally-ordered translation list comprises the steps of:

generating an expanded translation list from an input translation list; and sorting the expanded translation list into a hierarchally-ordered expanded translation list.

8. The method of claim 7 wherein the stepf of generating an expanded translation list from an input translation list comprises the step of:

deriving equivalent-chunk pairs from translation pairs within the translation list.

9. A translation program that when executed by the computer causes the computer to perform a method for at least partially translating a phrase from a first language to a second language, the method comprising the steps of:

receiving a phrase to be translated;

identifying in the phrase a translatable portion;

selecting from a list of translation pairs having equivalent first-language and second-language chunks a pair having a first-language chunk that most closely matches the translatable portion, wherein at least a part of the translatable portion is identical to the selected first-language chunk; and replacing the at least a part of the translatable portion with the second-language chunk from the selected translation pair.

10. The program of claim 9, wherein the selected pair is selected from a hierarchically-ordered translation list.

11. The program of claim 9, wherein the closest match is a first language match in the list that maximizes the size of the at least a part of the translatable portion.

12. The program of claim 9, wherein the identified translatable portion does not include proper terms.

13. The program of claim 9, wherein the hierarchically-ordered translation list is ordered based on the number of words in the first language chunk.

14. The program of claim 13, wherein the step of locating a closest match comprises the steps of:

beginning with the first language chunks with the most words; and progressing downward to first language chunks with lesser word counts.

15. The program of claim 9 further comprising the step of generating the translation list.

16. The program of claim 15, wherein the step of generating the translation list comprises the steps of:

(i) generating an expanded translation list from an input translation list; and (ii) sorting the expanded translation list into a hierarchally-ordered expanded translation list.

17. The program of claim 16, wherein the act of generating an expanded translation list from an input translation list comprises the step of:

deriving equivalent-chunk pairs from translation pairs within the translation list.

18. The program of claim 9, further comprising the step of:

replacing, in an iterative manner, a remaining untranslated part of the translatable portion with one or more closest matches from the list if the at least a part of the translatable portion is less than the translatable portion.

19. The method of claim 9, further comprising the step of:

forwarding the at least partially translated phrase to human translator for additional translation if the at least a part of the translatable portion is less than the translatable portion.

20. A computer program product having a computer readable medium having computer program logic recorded thereon for storing a translation program that when executed by the computer causes the computer to at least partially translate a product description from a first language to a second language, the computer program product comprising:

means for receiving a product description phrase to be translated from a first language to a second language;

means for identifying in the phrase a translatable portion;

means for selecting from a list of translation pairs having equivalent first-language and second-language chunks a pair having a first-language chunk that most closely matches the translatable portion, wherein at least a part of the translatable portion is identical to the selected first-language chunk; and means for replacing the at least a part of the translatable portion with the second-language chunk from the selected translation pair.

* * * * *